United States Patent
Hori

(10) Patent No.: US 7,357,047 B2
(45) Date of Patent: Apr. 15, 2008

(54) POWER UNIT VEHICLE USE AUTOMATIC TRANSMISSION DEVICE

(75) Inventor: Yoshiaki Hori, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 203 days.

(21) Appl. No.: 11/151,514

(22) Filed: Jun. 13, 2005

(65) Prior Publication Data

US 2006/0053966 A1     Mar. 16, 2006

(30) Foreign Application Priority Data

Aug. 10, 2004 (JP) .............. 2004-232913

(51) Int. Cl.
*F16H 3/08* (2006.01)
(52) U.S. Cl. .......................... 74/329; 74/331
(58) Field of Classification Search ............. 74/229, 74/331, 340, 329
See application file for complete search history.

(56) References Cited

U.S. PATENT DOCUMENTS

| | | | | |
|---|---|---|---|---|
| 3,064,488 | A | * | 11/1962 | Lee et al. ............... 74/360 |
| 4,576,063 | A | * | 3/1986 | Akashi et al. ........... 74/745 |
| 4,594,908 | A | * | 6/1986 | Akashi et al. ........... 74/359 |
| 4,658,663 | A | | 4/1987 | Hiraiwa |
| 4,813,300 | A | * | 3/1989 | Ohkubo ................... 74/718 |
| 5,353,661 | A | * | 10/1994 | Ordo ....................... 74/331 |
| 6,826,974 | B2 | * | 12/2004 | Kobayashi ............... 74/339 |
| 7,121,162 | B2 | * | 10/2006 | Hatakeyama et al. .... 74/360 |
| 2003/0213336 | A1 | | 11/2003 | Hori et al. |

FOREIGN PATENT DOCUMENTS

| | | |
|---|---|---|
| EP | 0029711 | 6/1981 |
| EP | 0034411 | 8/1981 |
| EP | 0034412 | 8/1981 |
| GB | 2343491 | 5/2000 |
| GB | 2379251 | 3/2003 |
| GB | 2394261 | 4/2004 |
| JP | 2004-36835 | 2/2004 |

OTHER PUBLICATIONS

European Search Report dated Aug. 3, 2007.

\* cited by examiner

*Primary Examiner*—Tisha Lewis
(74) *Attorney, Agent, or Firm*—Hamre, Schumann, Mueller & Larson, P.C.

(57) ABSTRACT

A power unit with a multi-stage automatic transmission having two clutches for use in a vehicle as an automatic transmission. The transmission has a first group of driving gears fixed to a tubular auxiliary main shaft end a first group of follower gears rotatably mounted on a counter shaft with a first and only clutch performing powering engagement between the main shaft end the tubular auxiliary main shaft. The transmission has a second group of driving gears rotatably mounted on the main shaft and a second group of follower gears fixed to a tubular auxiliary counter shaft with a second clutch providing power connection between the counter shaft and the tubular auxiliary counter shaft.

8 Claims, 14 Drawing Sheets

FIG.3 changeover from first speed to second speed

FIG.4   second-speed cruising

FIG.5  changeover from second speed to third speed

FIG.6 third-speed cruising

FIG.7 changeover from third speed to fourth speed

FIG.9  manipulation table of 2-clutch, 3-shifter, 4-stage automatic transmission

| transmission stage / engaging element | clutch connection state | | shifter position | | |
|---|---|---|---|---|---|
| | first clutch 20 | second clutch 24 | first shifter 32 | second shifter 33 | third shifter 34 |
| neutral | | | neutral | neutral | neutral |
| first speed | O | | first-speed side | second-speed side | neutral |
| second speed | | O | first-speed side | second-speed side | neutral |
| | | | third-speed side | second-speed side | neutral |
| third speed | O | | third-speed side | second-speed side | neutral |
| | | | third-speed side | fourth-speed side | neutral |
| fourth speed | | O | third-speed side | fourth-speed side | neutral |
| backward | O | | neutral | neutral | backward side |

Note: "O" in a column "clutch connection" indicates connection

FIG.14
(Prior Art)

manipulation table of 3-clutch, 1-shifter, 3-stage automatic transmission

| engaging element / transmission stage | clutch connection state ||| shifter position |
| --- | --- | --- | --- | --- |
| | first clutch 020 | second clutch 023 | third clutch 026 | shifter 037 |
| neutral | | | | neutral |
| first speed | O | | | frontward side |
| second speed | | O | | frontward side |
| third speed | | | O | frontward side |
| backward | O | | | backward side |

Note: "O" in a column "clutch connection" indicates connection.

POWER UNIT VEHICLE USE AUTOMATIC TRANSMISSION DEVICE

FIELD OF THE INVENTION

The present invention relates to an automatic transmission device of a vehicle-use power unit.

BACKGROUND OF THE INVENTION

FIG. 13 is a constitutional developed view of a conventional power unit 01 which is mounted on a buggy car or the like including respective rotary shafts thereof for example, see JP-A-2004-36835. In the drawing, a left side (indicated by an arrow F) is a front side of a vehicle. The power unit 01 is formed of an integral body constituted of an internal combustion engine 02 and a transmission 03 and includes a crankshaft 04 which extends in the fore-and-aft direction of a vehicle body, a main shaft 05 of the transmission, a counter shaft 06 of the transmission 03, an output shaft 07 and a backward driving changeover intermediate shaft 08. These rotary shafts are arranged in parallel to each other and are rotatably supported by front and rear crankcase members and a power is transmitted to an output shaft 07 from the crankshaft 04 by way of a transmission step. In this example, the internal combustion engine 02 is a single-cylinder internal combustion engine, wherein a piston 010 is connected to the crankshaft 04 by way of a connecting rod 09 and the piston 010 performs the reciprocating movement in a cylinder 011 to generate a power.

A torque converter 012 is mounted on a front end portion of the crankshaft 04. The torque converter 012 is constituted of a pump impeller 013 which is fixed to the crankshaft 04, a turbine runner 014 which is freely rotatable while facing the pump impeller 013 in an opposed manner and a stator 015 which is held by a crankcase member 017 by way of a one way clutch 016. To the turbine runner 014 which is rotatable with respect to the crankshaft 04, a primary driving gear 018 which is rotatable with respect to the crankshaft 04 is integrally joined. A power generated by the internal combustion engine 02 is transmitted to the pump impeller 013 from the crankshaft 04, is transmitted to the turbine runner 014 by way of a working oil and hence, the primary driving gear 018 is driven.

To a front end portion of the main shaft 05 of the transmission, a primary follower gear 019 which is constantly meshed with the primary driving gear 018 is fixed. The rotation of the crankshaft 04 is transmitted to the main shaft 05 of the transmission by way of a primary speed reduction which is constituted of the primary driving gear 018 and the primary follower gear 019. A first hydraulic multi-plate clutch 020 is arranged close to the above-mentioned primary follower gear 019 fixed to the front end portion of the main shaft 05. A clutch outer 021 of the above-mentioned multi-plate clutch 020 is fixed to the main shaft, while a clutch inner 022 is joined to a first-speed driving gear M01 which is freely rotatable with respect to the main shaft 05. To a rear portion of the main shaft 05 which extends while penetrating the center of the first multi-plate clutch 020 and a center hole of the first-speed driving gear M01, a second-speed driving gear M02 and a third-speed driving gear M03 are fixed.

To a front end portion of the counter shaft 06 which is rotatably supported in parallel to the above-mentioned main shaft 05, a first-speed follower gear C01 which is constantly meshed with the above-mentioned first-speed driving gear M01 is fixed. On a center portion of the counter shaft 06, a second-speed hydraulic multi-plate clutch 023 and a third-speed hydraulic multi-plate clutch 026 are mounted. Both of clutch outers 024, 027 of the above-mentioned clutches are fixed to the counter shaft 06. A clutch inner 025 of the above-mentioned second-speed multi-plate clutch 023 is joined to a second-speed follower gear C02 which is freely rotatable with respect to the counter shaft 06, while a clutch inner 028 of the above-mentioned third-speed multi-plate clutch 026 is joined to a third-speed follower gear C03 which is freely rotatable with respect to the counter shaft 06.

On a rear portion of the counter shaft 06, a forward output gear 029 and a backward output gear 030 are mounted in a state that these gears are rotatable with respect to the counter shaft 06. Between both gears, a dog clutch 031 which is fitted on the counter shaft 06 in spline fitting and is movable in the fore-and-aft direction is provided. To a backward driving changeover intermediate shaft 08 which is arranged close to and in parallel to the counter shaft 06 and rotatably, a first intermediate gear 032 which is constantly meshed with the above-mentioned backward output gear 030 and a second intermediate gear 033 which is constantly meshed with an output follower gear 034 described later are fixed, and both of these intermediate gears 032, 033 are interlocked with each other by way of the backward driving changeover intermediate shaft 08.

To the output shaft 07 which is arranged in parallel to the above-mentioned counter shaft, an output shaft follower gear 034 which is constantly meshed with the above-mentioned forward output gear 029 and the second intermediate gear 033 is fixed. An output of the power unit 01 is transmitted to a front wheel from a front end of the output shaft 07 and is transmitted to the rear wheel from the rear end of the output shaft 07.

In the vicinity of the counter shaft 06, a forward and backward changeover device 035 is provided. The forward and backward changeover device 035 is constituted of a shift drum 036 which is rotatably supported in parallel to the counter shaft 06, one shifter 037 which is driven in the fore-and-aft direction along one cam groove which is formed in an outer periphery of the shift drum 036, and a manual rotating device which serves to rotatably drive the shift drum 036. The above-mentioned manual rotating device is constituted of a shift spindle 038, a change lever 039 which is formed on an end portion of the shift spindle 038, a sector gear 040 which is mounted on the shift spindle, and a gear 041 which is integrally formed on a shaft 036a of the shift drum 036 and is meshed with the above-mentioned sector gear 040. The shifter 037 is engaged with the dog clutch 031 and moves the dog clutch 031 in the fore-and-aft direction so as to perform the changeover of the forward driving and the backward driving. Here, an alternating current generator 042 which generates an electric power by the rotation of the crankshaft 04 is mounted on the rear end of the crankshaft 04.

In the above-mentioned transmission 03, the selection of the forward driving and the backward driving is decided based on whether, using the forward and backward changeover device 035, the shifter 037 is moved to the forward output gear 029 side so as to allow the dog clutch 031 to be engaged with the above-mentioned gear 029 or the shifter 037 is moved to the backward output gear 030 side so as to allow the dog clutch 031 to be engaged with the above-mentioned gear 030. The selection of the transmission ratio in the forward driving state is determined based on which one of three multi-plate clutches 020, 023, 026 is selectively connected and which one of the gears M01, C02, C03 is selectively joined to the shaft. Here, when the backward driving state is selected, the first multi-plate clutch 020 is selectively connected so that the first-speed driving gear M01 is selectively joined to the shaft. The operation and the changeover of the hydraulic multi-plate clutch are performed using a hydraulic device not shown in the drawing. FIG. 14 is an automatic transmission manipulation table which arranges the selective manipulations of the clutches and the shifter in the above-mentioned conventional power unit.

However, since the conventional transmission adopts the three-stage automatic transmission, there has been a demand for a multi-stage automatic transmission having a larger number of stages. Further, it has also been a task to reduce the number of parts of a multi-plate clutch having a large weight.

Further, in the conventional transmission, to perform the changeover of the forward driving and the backward driving, a change lever is manually manipulated so as to change over gears, the manipulation becomes cumbersome.

SUMMARY OF THE INVENTION

The present invention, which has overcome the above-mentioned tasks, relates to a vehicle-use automatic transmission device including a main shaft and a counter shaft, wherein the transmission device comprises: a first group of driving gears which are fixed to an tubular auxiliary main shaft which is concentrically and rotatably mounted on the main shaft; a first group of follower gears which are rotatably mounted on the counter shaft and are constantly meshed with the first group of driving gears so as to be selectively joined to the counter shaft; a first clutch which performs the power connection and power disconnection between the main shaft and the tubular auxiliary main shaft; a second group of driving gears which are rotatably mounted on the main shaft and are selectively jointed to the main shaft; a second group of follower gears which are fixed to an tubular auxiliary counter shaft which is concentrically and rotatably mounted on the counter shaft and are constantly meshed with the second group of driving gears; and a second clutch which performs the power connection and disconnection between the counter shaft and the tubular auxiliary counter shaft. The number of clutches having a large weight is decreased to two and hence, it is possible to provide a light-weighted multi-stage automatic transmission.

Further, the vehicle-use automatic transmission device may comprise either one of a first group of gears which are constituted of the first group of driving gears and the first group of follower gears and a second group of gears which are constituted of the second group of driving gears and the second group of follower gears is constituted of a group of odd-numbered-stage gears and another group of gears is constituted of a group of even-numbered-stage gears. Since the odd-numbered stage gears and the even-numbered stage gears are arranged in a state that these gears are divided into the first group of gears and the second group of gears, it is possible to avoid a situation that the clutches and the gear selection and joining means are simultaneously manipulated at the time of transmission whereby the smooth transmission is ensured.

The vehicle-use automatic transmission device may further comprise a backward driving gear which is fixed to the tubular auxiliary main shaft and a backward follower gear which is rotatably mounted on the counter shaft and is constantly meshed with the backward driving gear by way of an intermediate gear so as to be selectively jointed to the counter shaft. It is possible to perform the light-weighted multi-stage automatic transmission having the frontward and backward driving changeover function.

The vehicle-use automatic transmission device may further comprise a backward driving gear which is rotatably mounted on the main shaft and is selectively joined to the main shaft and a backward follower gear which is fixed to the tubular auxiliary counter shaft and is constantly meshed with the backward driving gear by way of an intermediate gear. Accordingly, it is possible to perform the light-weighted multi-stage automatic transmission in another mode having the frontward and backward driving changeover function.

The vehicle-use automatic transmission device may comprise a means which selectively joins the gear to the shaft is configured to include a shifter which is driven by an electrically-operated motor and a means which is driven by the shifter, is slidable in the axial direction and is engaged with or is disengaged from the gear which is rotatable with respect to the shaft. Since the selective fixing of the gear is performed using the electrically-operated motor which is manipulated with a switch, the transmission and the forward/backward changeover manipulation are facilitated. Further, since the mechanical gear selection manual lever is replaced with the switch which operates the electrically-operated motor, a layout of a periphery of a handle becomes concise.

BRIEF DESCRIPTION OF THE DRAWINGS

FIG. 9 An automatic transmission manipulation table in a power unit of the present invention.

FIG. 14 An automatic transmission manipulation table in the conventional power unit.

DETAILED DESCRIPTION OF THE INVENTION

Figure 1:
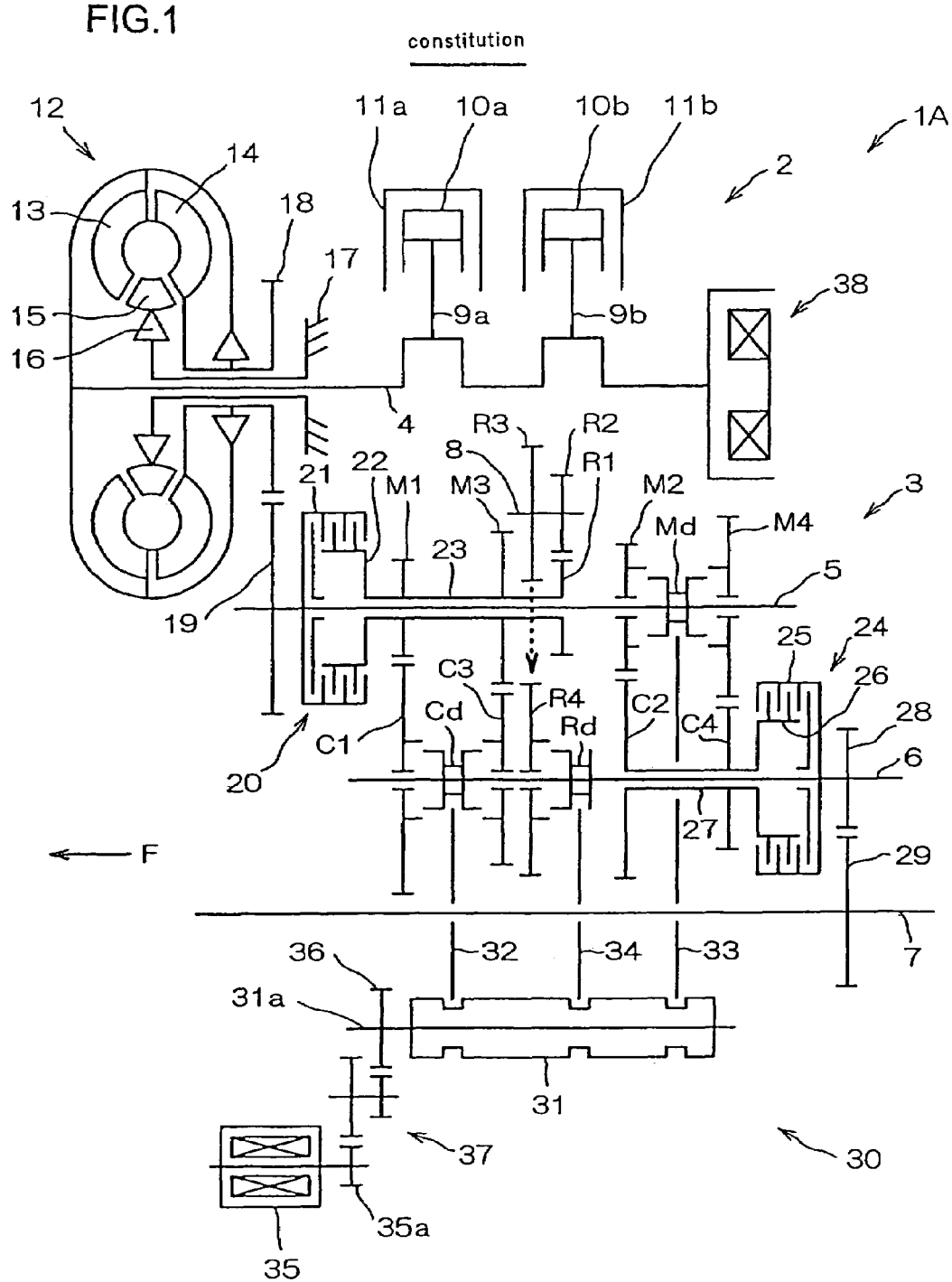
FIG. 1 A constitutional developed view of power unit 1A according to the first embodiment of the present invention.

FIG. 1 is a constitutional developed view including respective rotary shafts of a power unit 1A according to the first embodiment of the present invention which is mounted on a buggy vehicle or the like. In the drawing, a left side (indicated by an arrow F) is a front side of a vehicle. The power unit 1A is formed of an integral body. constituted of an internal combustion engine 2 and a transmission 3 and includes a crankshaft 4 which is arranged to extend in the fore-and-aft direction of a vehicle body, a main shaft 5 of the transmission, a counter shaft 6 of the transmission, an output shaft 7 and a backward driving changeover intermediate shaft 8. These rotary shafts are arranged in parallel to each other and are rotatably supported by front and rear crankcase members and a power is transmitted to an output shaft 7 from the crankshaft 4 by way of a transmission step. In this embodiment, the internal combustion engine 2 is a two-cylinder internal combustion engine, wherein pistons 10a, 10b are connected to the crankshaft 4 by way of connecting rods 9a, 9b and the pistons 10a, 10b perform the reciprocating movement in cylinders 11a, 11b respectively to generate a power.

An AC power generator 38 which generates a power by the rotation of the crankshaft 4 is mounted on a rear end of the crankshaft 4, while a torque converter 12 is mounted on a front end portion of the crankshaft 4. The torque converter 12 is constituted of a pump impeller 13 which is fixed to the crankshaft 4, a turbine runner 14 which is freely rotatable while facing the pump impeller 13 in an opposed manner and a stator 15 which is held by a crankcase portion 17 by way of a one way clutch 16. To the turbine runner 14 which is rotatable with respect to the crankshaft 4, a primary driving gear 18 which is rotatable with respect to the crankshaft 4 is connected. A power generated by the internal combustion engine 2 is transmitted to the pump impeller 13 from the crankshaft 4, is transmitted to the turbine runner 14 by way of a working oil and hence, the primary driving gear 18 is driven.

To a front end portion of the main shaft 5 of the transmission, a primary follower gear 19 which is constantly meshed with the primary driving gear 18 is fixed. The rotation of the crankshaft 4 is transmitted to the main shaft 5 of the transmission 3 by way of a primary reduction which is constituted of the primary driving gear 18 and the primary follower gear 19.

A first hydraulic multi-plate clutch 20 is arranged close to the above-mentioned primary follower gear 19 fixed to the front end portion of the main shaft 5. A clutch outer 21 of the above-mentioned multi-plate clutch 20 is fixed to the main shaft 5, while to a clutch inner 22 of the above-mentioned multi-plate clutch 20, a tubular auxiliary main shaft 23 which covers the outside of a front half portion of the main shaft 5 and is rotatable with respect to the main shaft 5 is joined and the tubular auxiliary main shaft 23 is rotated together with the clutch inner 22. To the tubular auxiliary main shaft 23, a first-speed driving gear M1, a third-speed driving gear M3 and a backward driving gear R1 are fixed in order from the front side.

On a rear portion of the main shaft 5 which extends in a state that the main shaft 5 penetrates the center of the first hydraulic multi-plate clutch 20 and the center hole of the tubular auxiliary main shaft 23, a second-speed driving gear M2 and a fourth-speed driving gear M4 are rotatably supported with respect to the main shaft 5. Between these gears, a dog clutch Md which is fitted on the main shaft 5 by spline fitting and is movable in the fore-and-aft direction is provided.

On the backward driving changeover intermediate shaft 8 which is supported rotatably in parallel with the above-mentioned main shaft 5, a backward first intermediate gear R2 which is constantly meshed with the above-mentioned backward driving gear R1 and a backward second intermediate gear R3 which is interlocked with the backward first intermediate gear R2 by way or the backward changeover intermediate shaft 8 are mounted.

On a front half portion of the counter shaft 6 which is rotatably supported in parallel to the above-mentioned main shaft 5, a first-speed follower gear C1 which is constantly meshed with the above-mentioned first-speed driving gear M1 and a third-speed follower gear C3 which is constantly meshed with the above-mentioned third-speed driving gear M3 are rotatably supported. Between these gears, a dog clutch Cd which is fitted on the counter shaft 6 in spline fitting and is movable in the fore-and-aft direction is provided. Close to and behind these gears, a backward follower gear R4 which is constantly meshed with the above-mentioned backward second intermediate gear R3 is rotatably supported on the counter shaft 6. Behind the backward follower gear R4, a dog clutch Rd which is fitted on the counter shaft 6 in spline fitting and is movable in the fore-and-aft direction is provided.

On a rear end portion of the counter shaft 6, a second hydraulic multi-plate clutch 24 is mounted. A clutch outer 25 of the above-mentioned multi-plate clutch 24 is fixed to the counter shaft 6. To a clutch inner 26 of the above-mentioned multi-plate clutch 24, a tubular auxiliary counter shaft 27 which covers the outside of a rear half portion of the counter shaft 6 and is rotatable with respect to the counter shaft 6 is joined. The tubular auxiliary counter shaft 27 is rotated together with the clutch inner 26. To the tubular auxiliary counter shaft 27, a second-speed follower gear C2 which is constantly meshed with the above-mentioned second-speed driving gear M2 and a fourth-speed follower gear C4 which is constantly meshed with the above-mentioned fourth-speed driving gear M4 are fixed in order from the front side. A counter shaft output gear 28 is fixed to a rearmost portion of the counter shaft 6.

To an output shaft 7 which is arranged in parallel with the above-mentioned counter shaft 6, an output shaft follower gear 29 which is constantly meshed with the above-mentioned counter shaft output gear 28 is fixed. An output of the power unit 1A is transmitted to the front wheel from a front end of the output shaft 7 and is transmitted to the rear wheel from a rear end of the output shaft 7.

A gear changeover device 30 is provided in the vicinity of the main shaft 5 and the counter shaft 6. The gear changeover device 30 is constituted of a shift drum 31 which is rotatably supported in parallel to the main shaft 5 and the counter shaft 6, three shifters consisting of a first shifter 32, a second shifter 33, a third shifter 34 which are driven in the fore-and-aft direction along three cam grooves formed in an outer periphery of the shift drum 31, and a drive device for rotatably driving the shift drum 31 such as an electrically-operated motor 35. A gear 36 is mounted on a shaft 31a of the shift drum and is meshed with an output pinion 35a of the above-mentioned electrically-operated motor 35 by way of a group of speed reduction gears 37. Due to the actuation of the above-mentioned electrically-operated motor 35, the shift drum 31 is rotated to a suitable position and three shifters 32, 33, 34 are selectively moved. The above-mentioned first shifter 32 is meshed with the dog clutch Cd, the second shifter 33 is meshed with the dog clutch Md and the third shifter 34 is meshed with the dog clutch Rd respectively so as to move these dog clutches in the for-and-aft direction. The electrically-operated motor 35 is manipulated by a switch mounted on a handle.

In the above-mentioned transmission, the dog clutch Cd can assume a first-speed-side position where the dog clutch Cd is engaged with the first-speed follower gear C1, a third-speed-side position where the dog clutch Cd is engaged with the third-speed follower gear C3 and a neutral position in the midst of the above-mentioned both positions. The dog clutch Md can assume a second-speed-side position where the dog clutch Md is engaged with the second-speed driver gear M2, a fourth-speed-side position where the dog clutch Md is engaged with the fourth-speed driving gear M4 and a neutral position in the midst of the above-mentioned both positions. The dog clutch Rd can assume a backward-side position where the dog clutch Rd is engaged with the backward follower gear R4 and a neutral position which is remote from the backward follower gear R4.

The selective joining of the respective gears consisting of the frontward first-speed to fourth-speed gears and the backward gear with respect to the shaft is performed by moving the above-mentioned dog clutches in the fore-and-aft direction by way of three shifters thus allowing the dog clutches to be engaged with the gears mounted rotatably with respect to the shaft thus selectively joining the gears to the shaft. The positions of the shifters are determined by cam grooves which are preliminarily programmed and are formed in the shift drum. The rotation of the shift drum is performed based on a control of the above-mentioned electrically-operated motor 35. With respect to the position of the first shifter 32, the front side is set as the first-speed-side position, the rear side is set as the third-speed-side position and the intermediate between both sides is set as the neutral position. With respect to the position of the second shifter 33, the front side is set as the second-speed-side position, the rear side is set as the fourth-speed-side position and the intermediate between both sides is set as the neutral position. With respect to the position of the third shifter 34, the front side is set as the backward-side position and the rear side is set as the neutral position.

FIG. 2 to FIG. 8 are explanatory views of the manipulation of the above-mentioned transmission. The power generated by the internal combustion engine 2 is transmitted to the primary driving gear 18 by way of the crankshaft 4 and the torque converter 12. The power transmission path up to this primary driving gear 18 is equal irrelevant to the transmission mode. The above-mentioned manipulation explanatory views indicate the power transmission paths from the primary driving gear 18 to the output shaft follower gear 29 corresponding to the transmission stages in a bold line.

Figure 2:
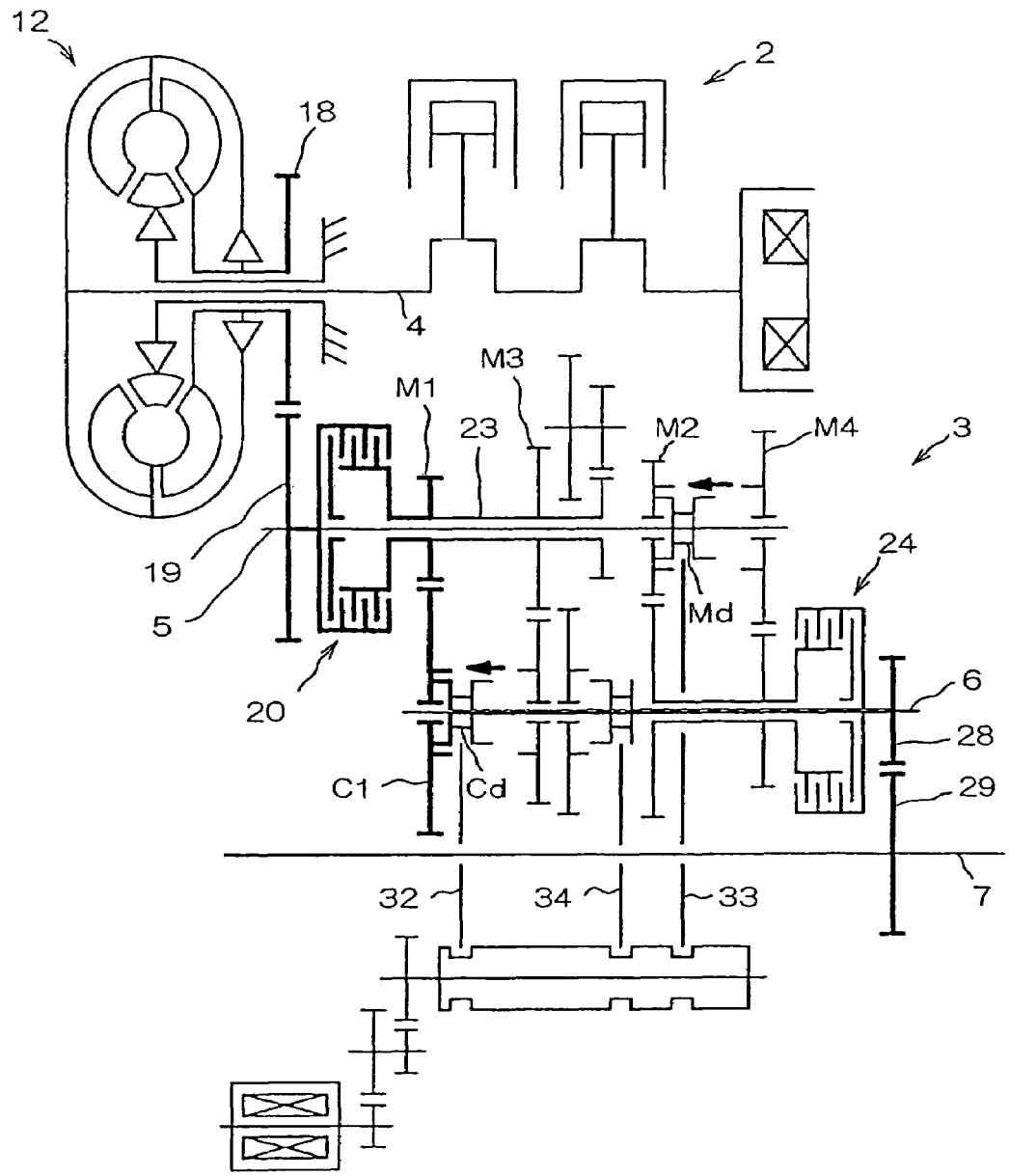
FIG. 2 A view showing a first-speed starting manipulation.

FIG. 2 is a view which shows the first-speed starting operation. At this point of time, the first shifter 32 is shifted to the first-speed side so as to allow the dog clutch Cd to be meshed with the first-speed follower gear C1, the second shifter 33 is shifted to the second-speed side so as to allow the dog clutch Md to be meshed with the second-speed driving gear M2, and the third shifter 34 is held at the neutral position. Here, the third shifter 34 is always held in the neutral position during the forward driving. When the first multi-plate clutch 20 is connected in the above-mentioned state, the vehicle travels with the first-speed starting. The power from the primary driving gear 18 is transmitted to the output shaft 7 by way of the primary follower gear 19, the main shaft 5, the first multi-plate clutch 20, the tubular auxiliary main shaft 23, the first-speed driving gear M1, the first-speed follower gear C1, the counter shaft 6, the counter shaft output gear 28 and the output shaft follower gear 29 and, thereafter, the power is outputted to the wheel. Although the second-speed driving gear M2 is fixed to the shaft by way of the dog clutch Md, the second multi-plate clutch 24 is not connected and hence, the power is not transmitted to the counter shaft 6.

Figure 3:
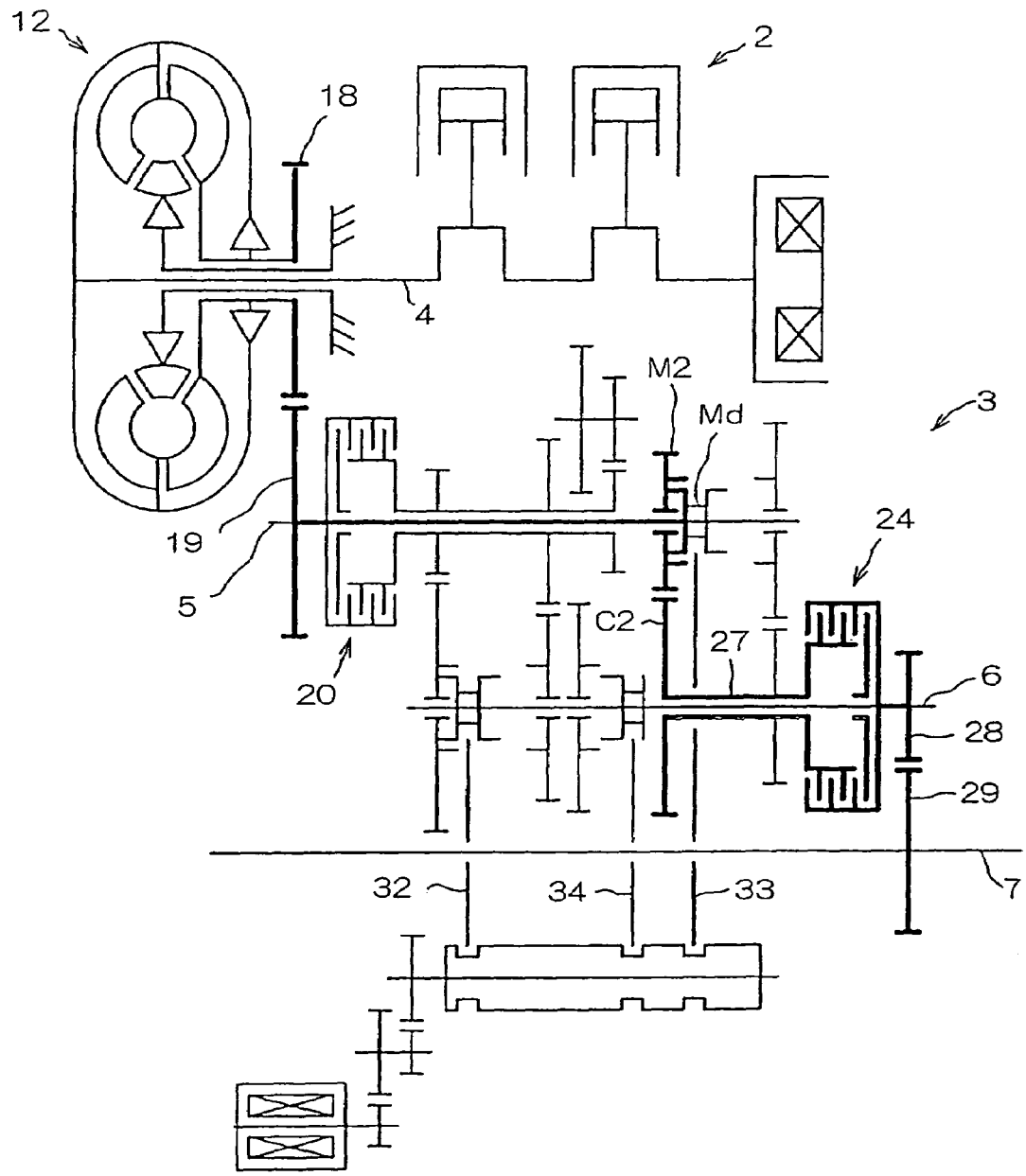
FIG. 3 A view showing a changeover manipulation from the first speed to the second speed.

FIG. 3 is a view which shows the changeover manipulation from the first speed to the second speed. The positions of the shifters are not moved and are held at positions taken in the first speed shown in FIG. 2. By changing over the hydraulic pressure supply destination from the first multi-plate clutch 20 to the second multi-plate clutch 24 in such a state, the transmission to the second speed is performed. The power from the primary driving gear 18 is transmitted to the output shaft 7 by way of the primary follower gear 19, the main shaft 5, the dog clutch Md, the second-speed driving gear M2, the second follower gear C2, the tubular auxiliary counter shaft 27, the second multi-plate clutch 24, the counter shaft 6, the counter shaft output gear 28, and the output shaft follower gear 29.

Figure 4:
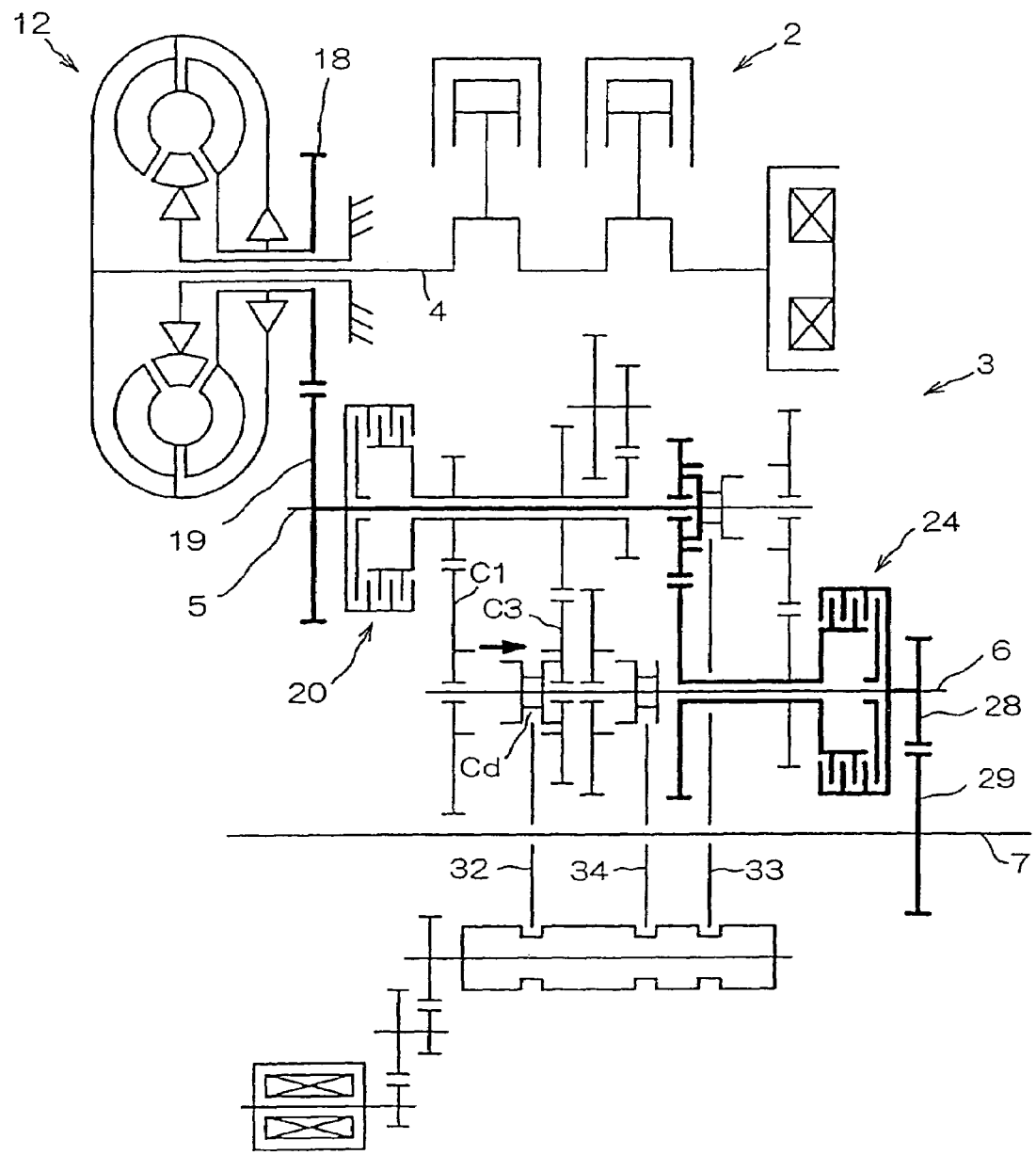
FIG. 4 A view showing a manipulation during the second-speed cruising.

FIG. 4 is a view showing the manipulation during the second-speed cruising. The hydraulic pressure destination clutch is held at the second multi-plate clutch 24 and is not changed. The power transmission path is equal to the power transmission path of the second speed shown in FIG. 3. As the preparation for changeover to the third speed, the first shifter 32 is moved, the dog clutch Cd which is disposed outside the second-speed power transmission path is moved to the third-speed side from the first-speed side so as to allow the dog clutch Cd to be meshed with the third-speed follower gear C3.

Figure 5:
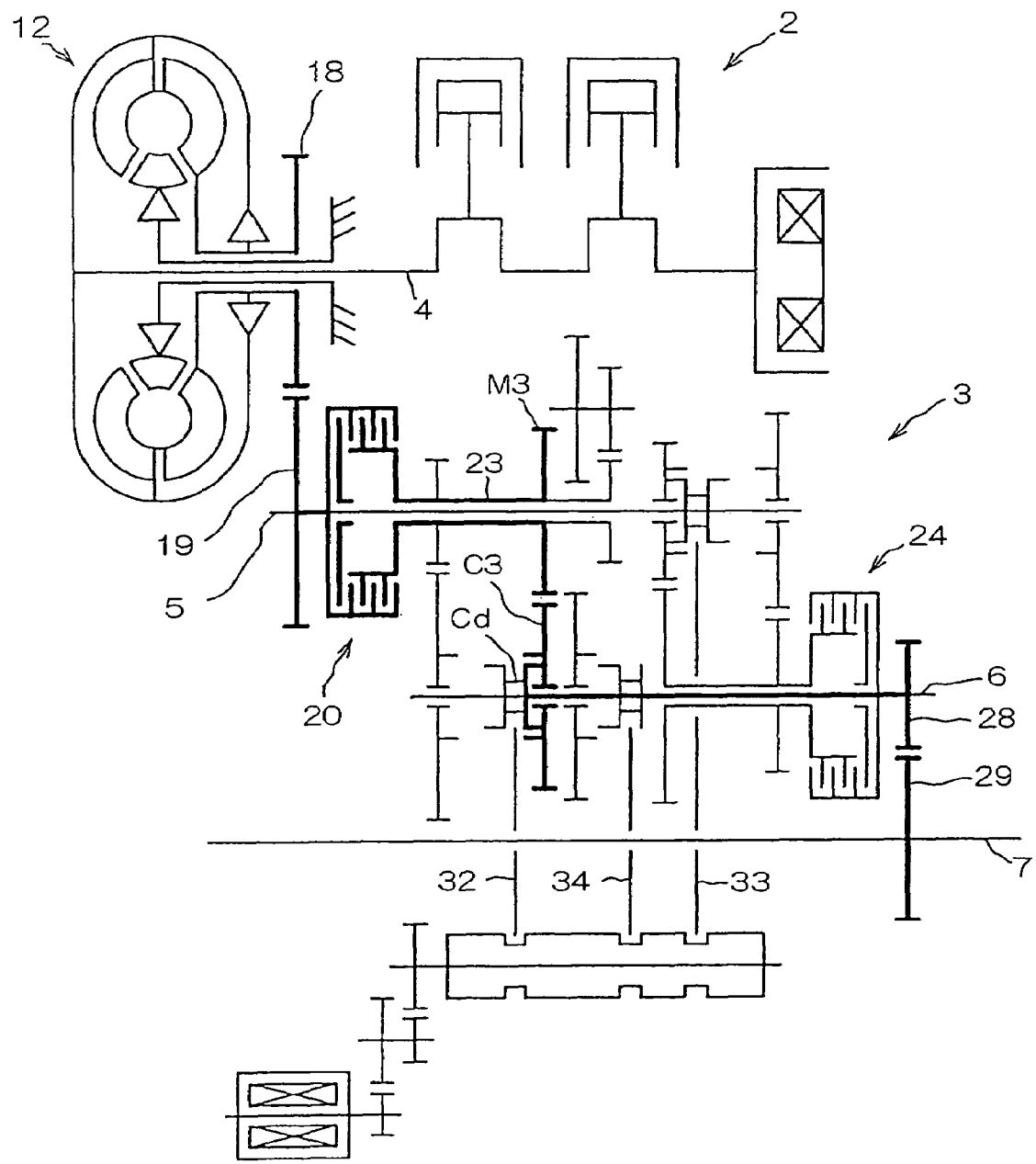
FIG. 5 A view showing a changeover manipulation from the second speed to the third speed.

FIG. 5 is a view showing the changeover manipulation to the third speed from the second speed. The shifter positions are held at the positions at the time of completion of the second-speed cruising shown in FIG. 4 and are not moved. By changing over the hydraulic pressure supply destination from the second multi-plate clutch 24 to the first multi-plate clutch 20 in such a state, the transmission to the third speed is performed. The power from the primary driving gear 18 is transmitted to the output shaft 7 by way of the primary follower gear 19, the main shaft 5, the first multi-plate clutch 20, the tubular auxiliary main shaft 23, the third-speed driving gear M3, the third-speed follower gear C3, the dog clutch Cd, the counter shaft 6, the counter shaft output gear 28, and the output shaft follower gear 29.

Figure 6:
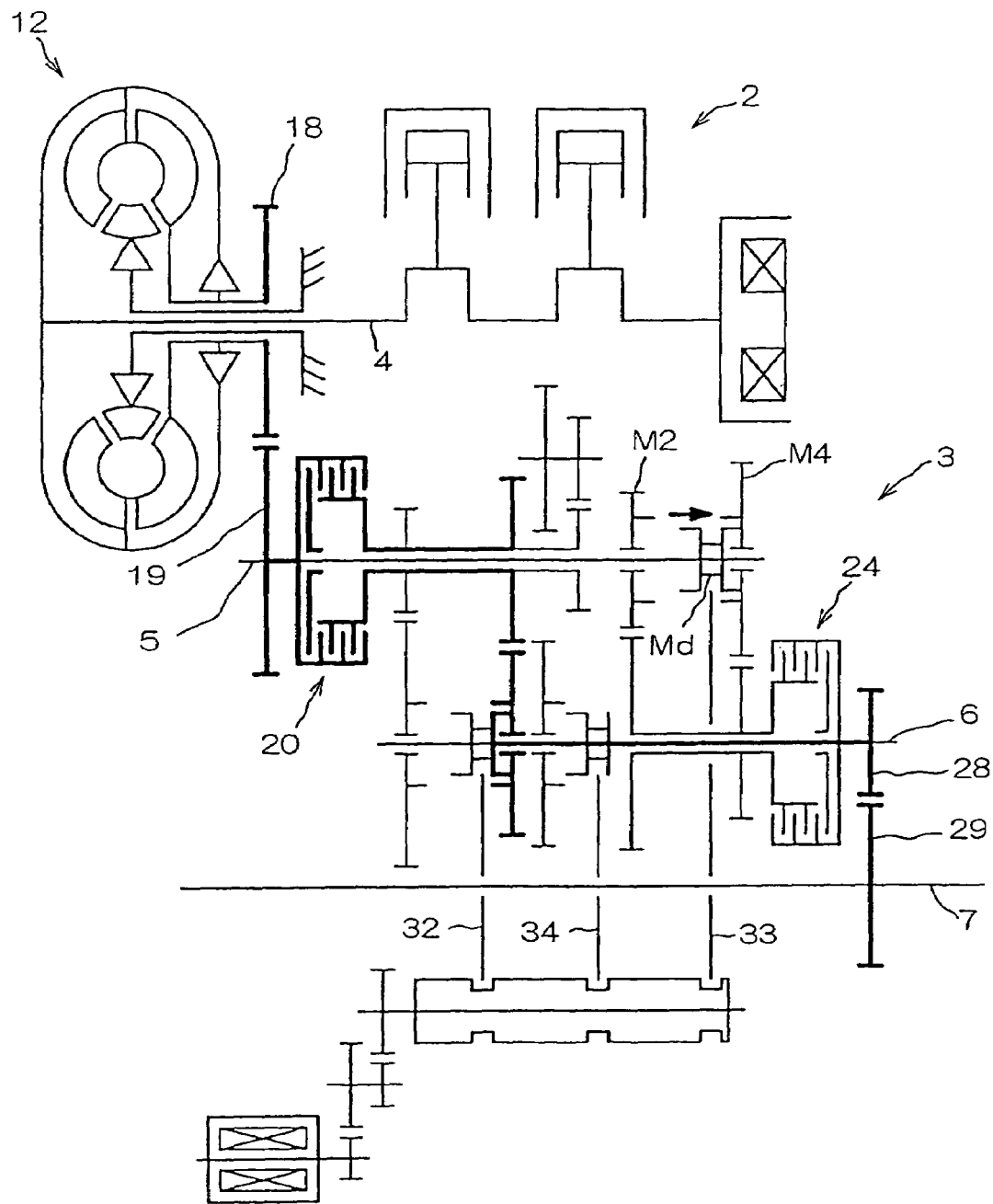
FIG. 6 A view showing a manipulation during the third-speed cruising.

FIG. 6 is a view showing the manipulation during the third-speed cruising. The hydraulic pressure destination clutch is held at the first multi-plate clutch 20 and is not changed. The power transmission path is equal to the third-speed power transmission path shown in FIG. 5. As the preparation for changeover to the fourth speed, the second shifter 33 is moved, the dog clutch Md which is disposed outside the third-speed power transmission path is moved to the fourth-speed side from the second-speed side so as to allow the dog clutch Md to be meshed with the fourth-speed driving gear M4.

Figure 7:
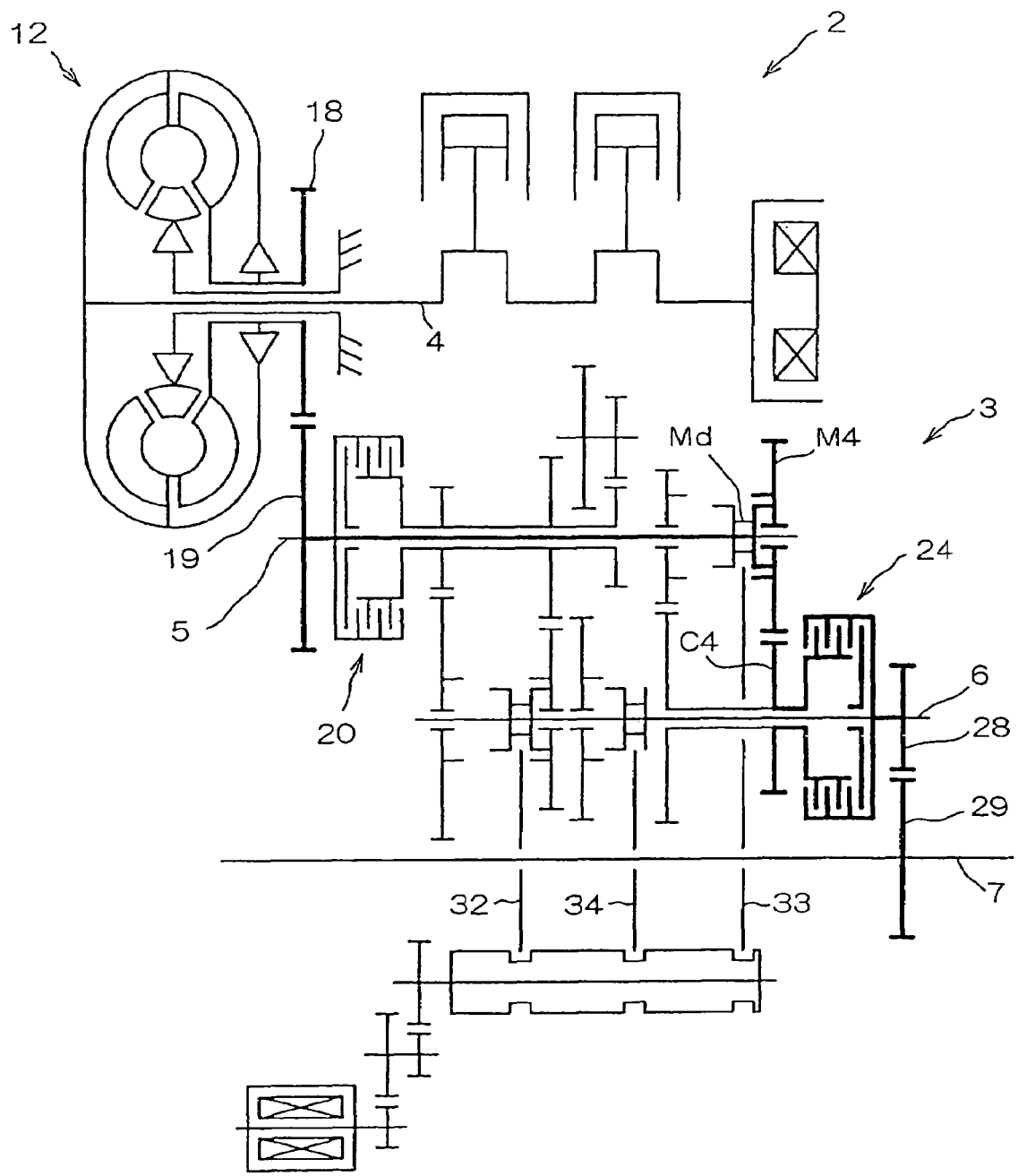
FIG. 7 A view showing a changeover manipulation from the third speed to the fourth speed.

FIG. 7 is a view showing the changeover manipulation to the fourth speed from the third speed. The shifter positions are held at the positions at the time of completion of the third-speed cruising as shown in FIG. 6 and are not moved. By changing over the hydraulic pressure supply destination from the first multi-plate clutch 20 to the second multi-plate clutch 24 in such a state, the transmission to the fourth speed is performed. The power from the primary driving gear 18 is transmitted to the output shaft 7 by way of the primary follower gear 19, the main shaft 5, the dog clutch Md, the fourth-speed driving gear M4, the fourth follower gear C4, the second multi-plate clutch 24, the counter shaft 6, the counter shaft output gear 28, and the output shaft follower gear 29.

Figure 8:
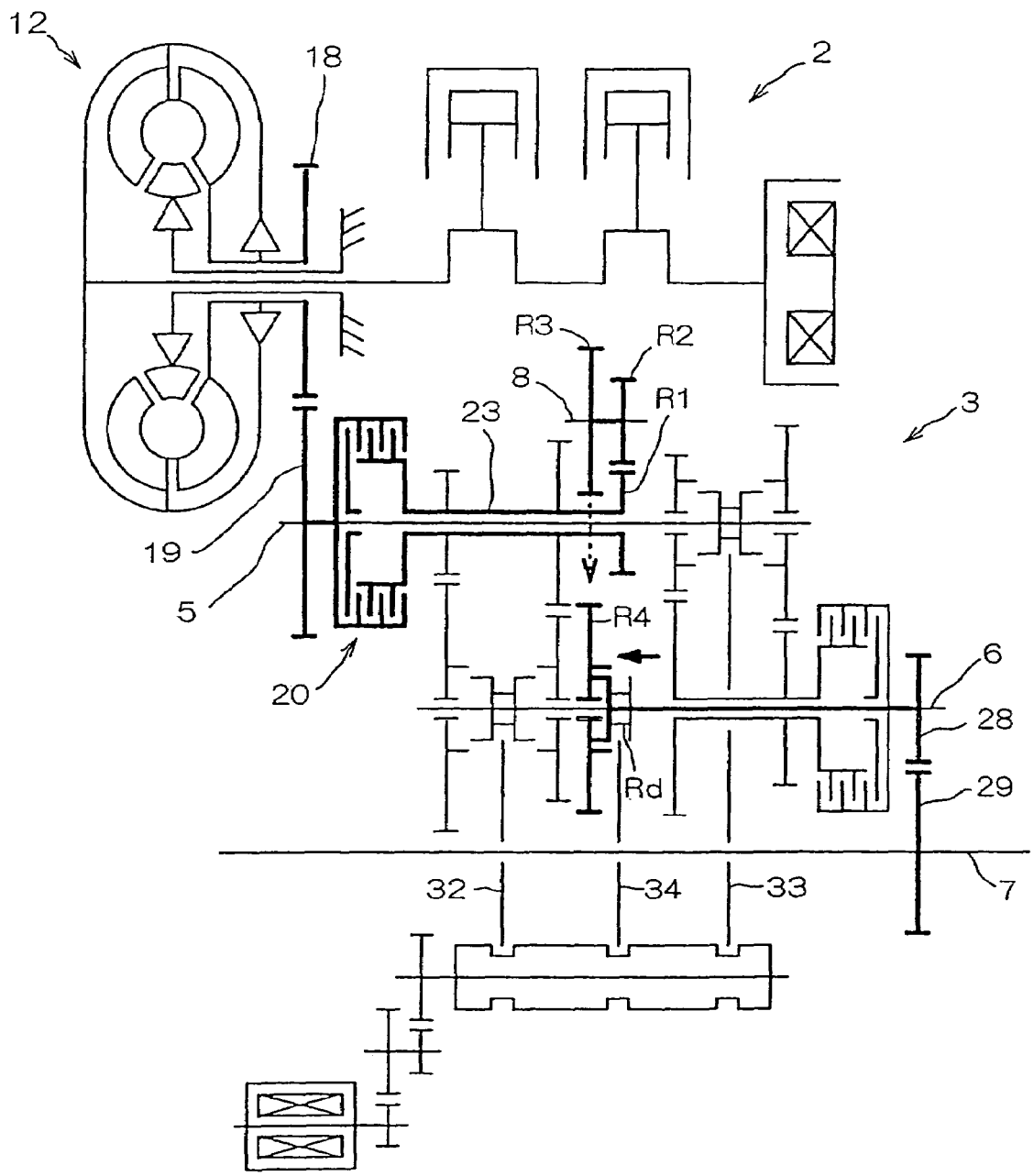
FIG. 8 A view showing a backward driving manipulation.

FIG. 8 is a view showing the backward manipulation. The first shifter 32 and the second shifter 33 are held at the neutral positions, while the third shifter 34 is moved to the backward side to allow the dog clutch Rd to be meshed with the backward follower gear R4. When the first multi-plate clutch 20 is connected in such a state, the vehicle moves backward. The power from the primary driving gear 18 is transmitted to the output shaft 7 by way of the primary follower gear 19, the main shaft 5, the first multi-plate clutch 20, the tubular auxiliary main shaft 23, the backward driving gear R1, the first intermediate gear R2, the second intermediate gear R3, the backward follower gear R4, the dog clutch Rd, the counter shaft 6, the counter shaft output gear 28 and the output shaft follower gear 29. Since the first intermediate gear R2 and the second intermediate gear R3 are interposed, the counter shaft 6, the output shaft 7 and the like are rotated in the reverse direction so that the wheel is driven backwardly.

In the above-mentioned respective manipulation stages, the manner of operation and the changeover of the hydraulic multi-plate clutches are performed using a hydraulic device not shown in the drawing.

In the constitution of the above-mentioned automatic transmission, the groups of gears except for the backward driving gears are given collective names. The group of gears which are fixed to the tubular auxiliary main shaft which is subjected to the power connection and disconnection with respect to the main shaft by the first clutch is named as the first group of driving gears, the group of gears which are mounted on the counter shaft, are constantly meshed with the above-mentioned first group of driving gears and are selectively joined to the counter shaft are named as the first group of follower gears. Both of these groups of gears are generally named as the first group of gears. Further, the group of gears which are mounted on the main shaft and are selectively joined to the main shaft are named as the second group of driving gears, the group of gears which are fixed to the tubular auxiliary counter shaft which is subjected to the connection and the disconnection with respect to the counter shaft by the second clutch and are constantly meshed with the above-mentioned second group of driving gears are named as the second group of follower gears and both of these groups of gears are generally named as the second group of gears.

FIG. 9 is an automatic transmission manipulation table which arranges the selective manipulations of the clutches and the shifters in the power unit 1A of the above-mentioned first embodiment. In the above-mentioned embodiment, the odd-numbered-stage gears and the even-numbered-stage gears are arranged in a divided manner as the first group of gears and the second group of gears and hence, it is possible to prevent the clutches and the selective joining means from being manipulated simultaneously at the time of transmission whereby it is possible to realize the smooth transmission.

Figure 10:
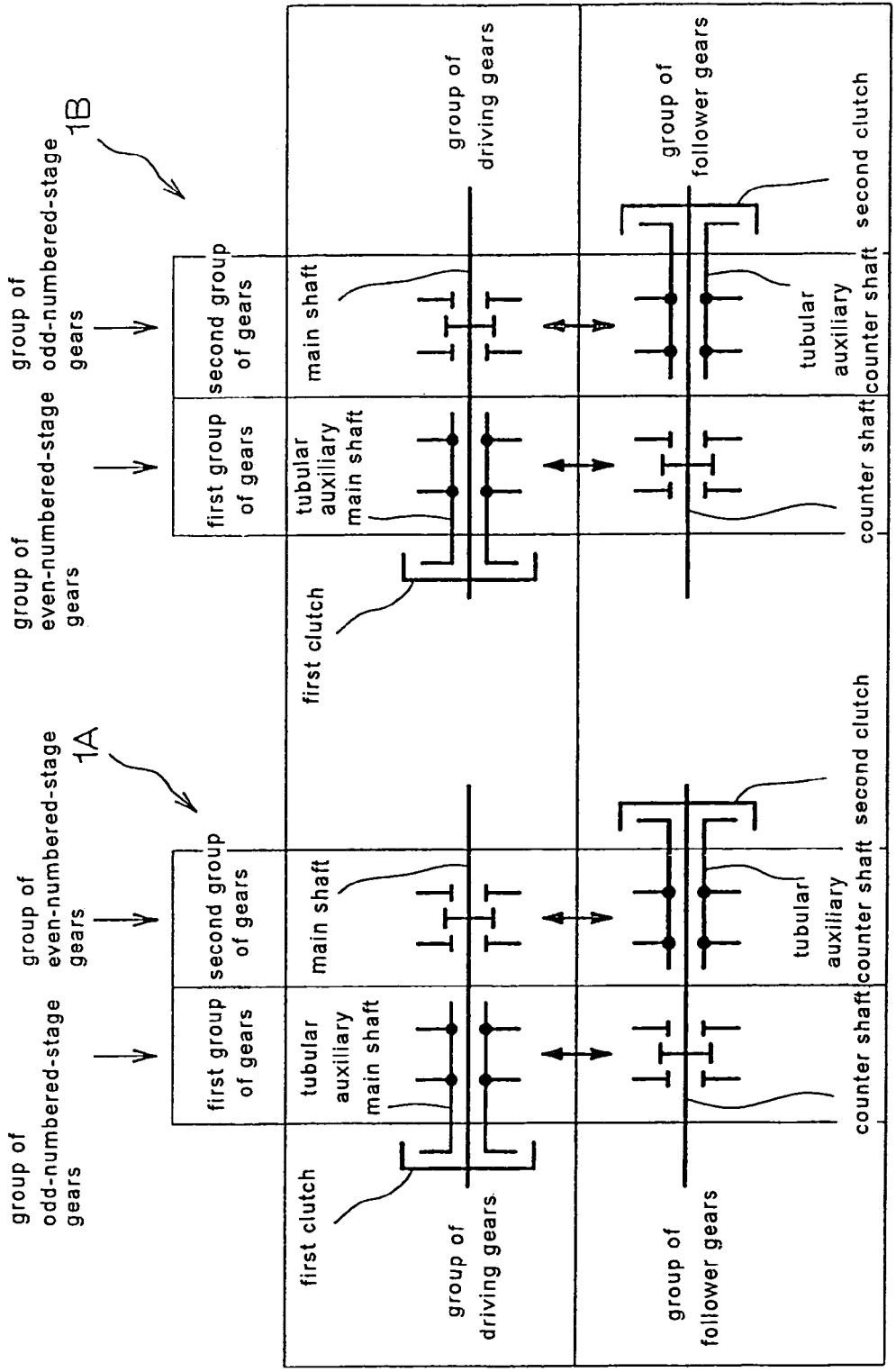
FIG. 10 An explanatory view of a power unit 1B according to the second embodiment of the present invention.

FIG. 10 is an explanatory view of a power unit 1B according to the second embodiment of the present invention wherein the transmission of the power unit 1A of the first embodiment and the transmission of the power unit 2B of the second embodiment are depicted in parallel. In the drawing, the crankshaft, the torque converter, the output shaft and the like are omitted. Although the first group of gears are constituted of the odd-numbered stage gears (first speed, third speed) and the second group of gears are constituted of the even-numbered stage gears (second speed, fourth speed) in the first embodiment, the second embodiment is configured such that the position of odd-numbered stage gears and the position of the even-numbered stage gears are exchanged thus constituting the first group of gears using the even-numbered stage gears (second speed, fourth speed) and the second group of gears using the odd-numbered stage gears (first speed, third speed). That is, to explain the second embodiment in more detail, the second-speed driving gears and the fourth-speed driving gears constitute the first group of driving gears, the second-speed follower gears and the fourth-speed follower gears constitute the first group of follower gears, the first-speed driving gear and the third-speed driving gear constitute the second group of driving gears, and the first-speed follower gear and the thirds-speed follower gear constitute the second group of follower gears. Also in the power unit 1B of the second embodiment, the even-numbered stage gears and the odd-numbered stage gears are arranged in a divided manner into the first group of gears and the second group of gears and hence, it is possible to prevent the clutches and the selective joining means from being manipulated simultaneously at the time of transmission whereby it is possible to realize the smooth transmission. Here, also in the second embodiment, the backward gears are arranged substantially in accordance with the arrangement of the backward gears in the first embodiment.

Figure 11:
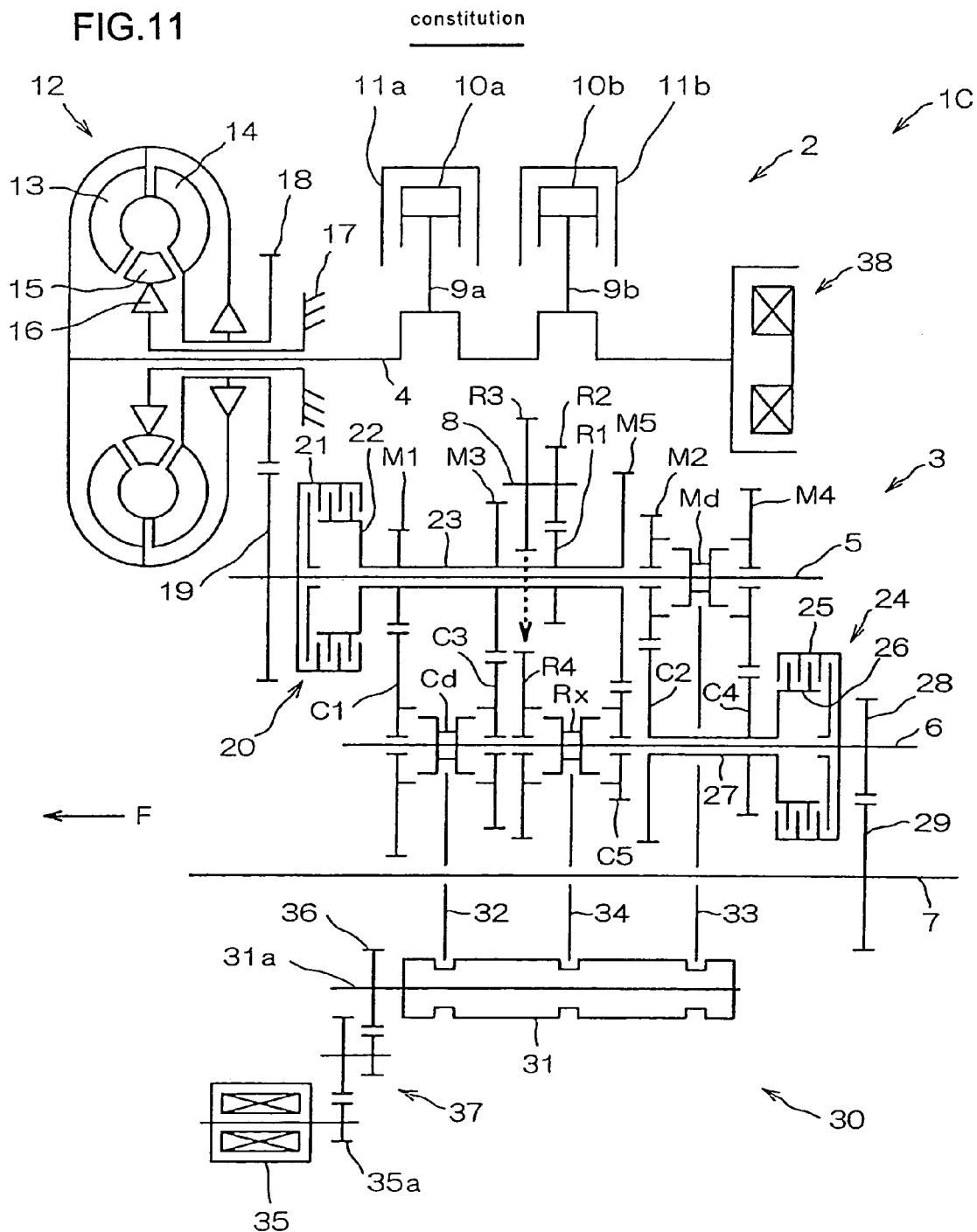
FIG. 11 A constitutional developed view of a power unit 1C according to the third embodiment of the present invention.

FIG. 11 is a constitutional developed view of a power unit 1C according to the third embodiment of the present invention. The power unit 1C of this embodiment is, compared to the power unit 1A of the first embodiment, characterized in that a fifth-speed driving gear M5 is additionally fixed onto the tubular auxiliary main shaft 23 close to the backward driving gear R1, a fifth-speed follower gear is rotatably mounted on the counter shaft 6, and a dog clutch Rx which is engaged with the backward follower gear and the fifth-speed follower gear is provided in place of the backward dedicated dog clutch Rd. In the drawing, members which do not differ in functions from the corresponding members of the first embodiment are given same symbols as the symbols used in the first embodiment. According to this embodiment, it is possible to realize the fifth-speed automatic transmission. Further, since the odd-numbered gears and the even-numbered gears are collected and are arranged in a divided manner into the first group of gears and the second group of gears, in the same manner as the transmission operation of the first embodiment, it is possible to perform the smooth transmission. According to the present invention, the present invention is not limited to the fifth-stage transmission of this embodiment and the transmission in a multi-stage can be realized in general.

Figure 12:
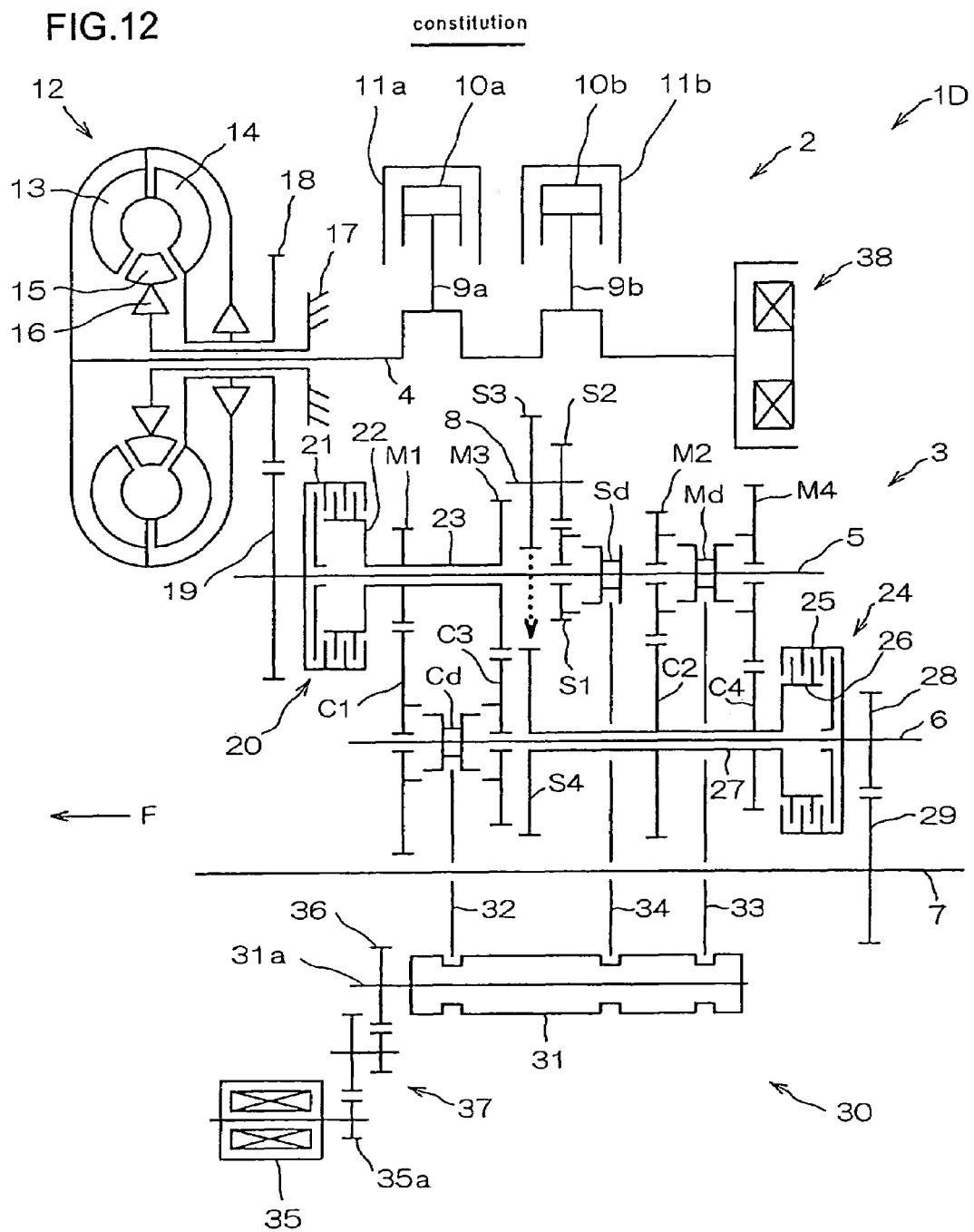
FIG. 12 A constitutional developed view of a power unit 1D according to the fourth embodiment of the present invention.
Figure 13:
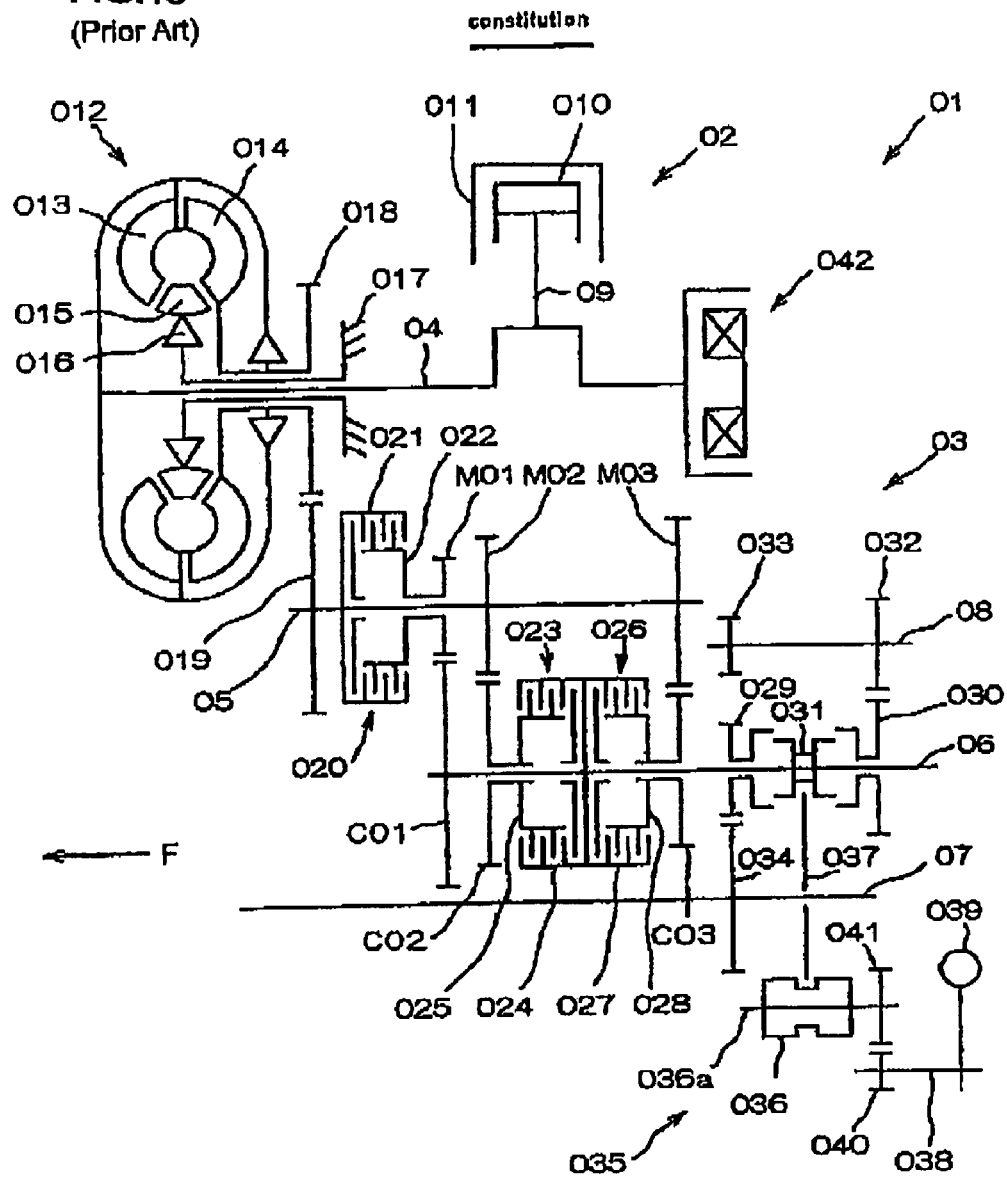
FIG. 13 A constitutional developed view of a conventional power unit.

FIG. 12 is a constitutional developed view of a power unit 1D according to the fourth embodiment of the present invention. The power unit 1D of this embodiment is characterized in that the positions of the group of backward gears shown in the first embodiment are changed and gears S1 to S4 and a dog clutch Sd are provided in place of the gears R1 to R4 and the dog clutch Rd. Member which have identical functions as the member in the first embodiment are given the same symbols used in the first embodiment. In front of the second-speed driving gear M2 mounted on the main shaft 5, a backward driving gear S1 which is rotatable with respect to the main shaft 5 and a dog clutch Sd which is fitted on the main shaft 5 in spline fitting and is movable in the fore-and-aft direction are provided. On a backward changeover intermediate shaft 8 which is rotatably supported in parallel to the above-mentioned main shaft 5, a backward first intermediate gear S2 which is constantly meshed with the above-mentioned backward driving gear S1 and a backward second intermediate gear S3 which is interlocked with the backward first intermediate gear S2 by way of the backward changeover intermediate shaft 8 are provided. To a front side of the tubular auxiliary counter shaft 27, a backward follower gear S4 which is constantly meshed with the above-mentioned backward second intermediate gear S3 is fixed.

In performing the backward traveling, the first shifter 32 and the second shifter 33 are held at the neutral position, the third shifter 34 is moved in the backward side so as to allow the dog clutch Sd to be meshed with the backward driving gear S1. When the second multi-plate clutch 24 is connected in this state, the vehicle moves backwardly.

As has been explained heretofore, the embodiments can obtain the following effects.

(1) The number of clutches having a large weight is decreased to two and hence, it is possible to provide the light-weighted multi-stage automatic transmission.

(2) Since the odd-numbered stage gears and the even-numbered stage gears are arranged in a state that these gears are divided into the first group of gears and the second group of gears, it is possible to avoid the situation that the clutches and the gear selection and joining means are simultaneously manipulated at the time of transmission whereby the smooth transmission is ensured.

(3) Since the selective fixing of the gears is performed electrically-operated motor which is manipulated with a switch, it is possible to easily perform the transmission and the frontward and backward driving changeover manipulation.

(4) Since the mechanical gear selection manual lever is replaced with the switch which operates the electrically-operated motor, the layout of a periphery of a handle becomes concise.

Although embodiments of the present invention have been described thus far, the present invention is not limited to the examples in the drawings and the embodiments described above, and various modification may be made without departing the scope of the present invention, as a matter of course.

I claim:

1. A power unit comprising an engine and a vehicle-use automatic transmission device, said engine having a crank case with a crank shaft supported by the crank case, said power unit further including a torque converter mounted on the crank shaft, said transmission device including a main shaft and a counter shaft, said crank shaft, said main shaft, and said counter shaft being arranged in parallel to each other and being rotatably supported by said crank case, said transmission device also including power receiving means for receiving power from said torque converter to drive said main shaft and power output means for transferring power from said counter shaft to a driven member; the transmission device further comprising:

a first group of driving gears which are fixed to a tubular auxiliary main shaft which is concentrically and rotatably mounted on the main shaft;

a first group of follower gears which are rotatably mounted on the counter shaft and are constantly meshed with the first group of driving gears so as to be selectively joined to the counter shaft;

a first and only clutch which performs the power engagement and power disengagement between the main shaft and the tubular auxiliary main shaft;

a second group of driving gears which are rotatably mounted on the main shaft and are selectively jointed to the main shaft;

a second group of follower gears which are fixed to a tubular auxiliary counter shaft which is concentrically and rotatably mounted on the counter shaft and are constantly meshed with the second group of driving gears; and a second and only clutch which performs the power connection and disconnection between the counter shaft and the tubular auxiliary counter shaft;

wherein the first and second clutches are the only clutches in said automatic transmission device so that said device is multi-stage, but light weight.

2. A power unit according to claim 1, wherein said transmission device includes either one of a first group of gears which are constituted of the first group of driving gears, and the first group of follower gears and a second group of gears which are constituted of the second group of driving gears and the second group of follower gears is constituted of a group of odd-numbered-stage gears and another group of gears is constituted of a group of even-numbered-stage gears.

3. A power unit according to claim 1, wherein the transmission device further comprises a backward driving gear which is fixed to the tubular auxiliary main shaft and a backward follower gear which is rotatably mounted on the counter shaft and is constantly meshed with the backward driving gear by way of an intermediate gear so as to be selectively jointed to the counter shaft.

4. A power unit according to claim 1, wherein the transmission device further includes a backward driving gear which is rotatably mounted on the main shaft and is selectively joined to the main shaft and a backward follower gear which is fixed to the tubular auxiliary counter shaft and is constantly inesbed with the backward driving gear by way of an intermediate gear.

5. A power unit according to claim 1, wherein a means which selectively joins the gear to the shaft is configured to include a shifter which is driven by an electrically-operated motor and a means which is driven by the shifter, is slidable in the axial direction and is engaged with or is disengaged from the gear which is rotatable with respect to the shaft.

6. A power unit according to claim 1, wherein said engine is a two-cylinder combustion engine.

7. A power unit according to claim 5, wherein the shifter includes a shift drum rotatably supported by the crank case in parallel with the main shaft.

8. A power unit according to claim 1, including a gear changeover device, said device including an electrically-operated motor, a shift drum with a shaft and a gear mounted on the shaft, and a group of reduction gears including an output pinion meshed with said gear mounted on the shaft of the shift drum, wherein said motor drives said shift drum by way of said group of speed reduction gears.

* * * * *